June 14, 1966 J. RYWAK Re. 26,036

RC-COUPLED MULTIVIBRATOR TRANSISTOR CIRCUIT

Original Filed Nov. 9, 1960

INVENTOR
John RYWAK
Robert B. Harmon
atty.

United States Patent Office

Re. 26,036
Reissued June 14, 1966

26,036
RC-COUPLED MULTIVIBRATOR TRANSISTOR CIRCUIT

John Rywak, Ottawa, Ontario, Canada, assignor to Northern Electric Company Limited, a corporation of Canada Original No. 3,097,313, dated July 9, 1963, Ser. No. 68,182, Nov. 9, 1960. Application for reissue July 10, 1964, Ser. No. 393,802
15 Claims. (Cl. 307—88.5)

Matter enclosed in heavy brackets [ ] appears in the original patent but forms no part of this reissue specification; matter printed in italics indicates the additions made by reissue.

This invention relates to multivibrator circuits and more particularly to such circuits employing transistors.

As is well known one of the limitations of transistors resides in the fact that the emission and control factors associated therewith depend markedly on the temperature at which the transistor operates. This is particularly true with respect to transistors employed in circuits for high power service wherein the heat liberated governs the stability of the circuit.

An object of this invention is to provide a multivibrator circuit employing transistors having temperature control means for improving the stability of the circuit.

Another object of this invention is to provide a multivibrator circuit employing transistors and having the foregoing characteristics in which a maximum power is transmitted to a load while maintaining the stability of the multivibrator circuit.

A further object of this invention is to provide a multivibrator circuit, employing transistors, that is not subject to transient triggering by noise in the power supply.

These and other objects of the invention are attained by providing a pair of transistors cross-coupled together to form a multivibrator circuit having unilateral directional means whereby the resistor-capacitor elements are disconnected during the operate time of the circuit.

*A further object of the invention is to provide a multivibrator circuit having a reduced recovery time.*

Figure 1:
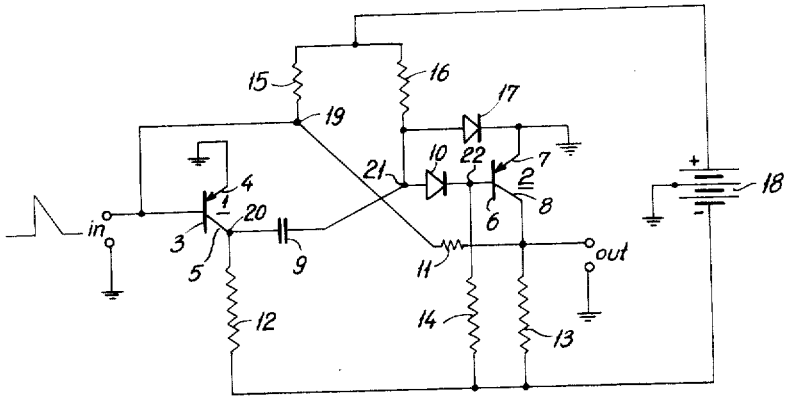
Figure 2:
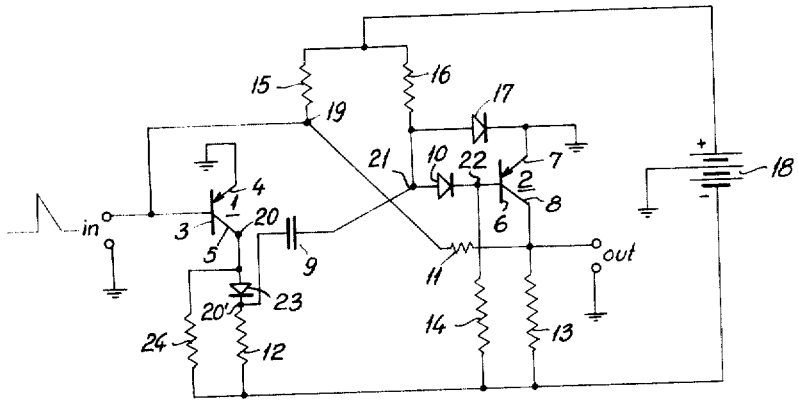

A better understanding of the invention may be had by referring to the following description, taken in conjunction with the drawings, in which like numerals refer to like parts, in which:

FIG. 1 illustrates a circuit schematic diagram of a multivibrator circuit in which the invention is represented, and FIG. 2 illustrates a circuit schematic diagram of a multivibrator circuit showing another embodiment of the invention.

Considering the drawings, there is shown a first and second semi-conductive device 1, 2 each having respectively a base, emitter and collector electrode 3, 4, 5 and 6, 7, 8. The transistors are cross connected by providing a coupling *arm* [means] connected between the collector electrode 5 of one of the transistors 1 and the base electrode 6 of the other transistor 2, which coupling *arm* includes the capacitor 9 and the *diode* [unilater directional element] 10 connected between the capacitor 9 and the base electrode 6 of the transistor 2, the *diode 10* [unilateral element] being so poled as to prevent the flow of current in the coupling during the operate [or the] time when transistor 2 is conducting. [, and] *By diode is meant any unidirectional element which when biased in one direction has a low impedance so as to pass current and when biased in the other direction has a high impedance so as effectively to block the passing of current.*

*A second* [a] coupling [means] *arm is* connected between the collector 8 of transistor 2 and the base 3 of the said one transistor 1, this coupling *arm* including the resistor 11. Also shown in the drawing are collector biasing resistors 12, 13 connected to the collector electrodes 5, 8 respectively, bias resistor 14 connected to the base electrodes 6 of transistor 2, *and* base biasing resistors 15, 16 connected to the base 3 of transistor 1 and to the anode of the unilateral element 10. Also shown is *diode* [unilateral device] 17 connected back to back with *diode* [unilateral device] 10 with its cathode connected to the emitter electrode 7 of transistor 2. *The emitters 4 and 7 of transistors 1 and 2 respectively are connected to ground, which thus constitutes a common reference voltage.* A source 18 provides energy for the circuit. The numerals 19, 20, 21 and 22 indicate points of reference potential.

The monostable circuit shown in FIG. 2 is the same as the monostable circuit shown in FIG. 1 with the exception that a *diode* [unilateral device] 23 and a resistor 24, connected together in series relation are connected in shunt relation with the collector resistor 12.

Representative values for the resistance of the resistors and the capacitance of the capacitors, employed in the circuits described are:

Resistor:

| | |
|---|---|
| **11** | 22K |
| **12** | 3.3K |
| **13** | 3.3K |
| **14** | 47K |
| **15** | 56K |
| **16** | 12K |
| **24** | 68K |

Capacitor:

| | |
|---|---|
| **9** | mf .0047 |

The following is the operation of the circuits.

STAND BY CONDITION

In this condition, FIG. 1, the circuit 18–15–11–13–18 is completed so that the *potential of* reference point [of potential] 19 is negative with respect to ground allowing a forward bias to be applied to the base 3 of transistor 1 which conducts. *It will be evident that, for the potential of reference point 19 to be negative with respect to ground as just mentioned, resistor 15 must have a resistance greater than the sum of the resistances of resistors 11 and 13.*

*Since resistor 16 is smaller in resistance value than resistor 14, the* [The] circuit 18–16–10–14–18, which is the biasing circuit for transistor 2 *ensures that the potential at reference point 21 is positive. In fact the potential at reference point 21 is above ground by the magnitude of the forward voltage drop across diode 17, and with the forward voltage drop across diodes 10 and 17 theoretically equal, the base of transistor 2 is virtually at ground potential.* [is not completed since diode 10 does not conduct due to resistor 16 being smaller in resistance value than resistor 14.] Transistor 2 is therefore non-conducting at this stage of the operation.

TRIGGERED CONDITION

When a positive pulse is applied to the base electrode 3 of transistor 1, this transistor 1 is cut off allowing its collector voltage at the reference point [of potential] 20 to fall. Due to this fall of potential at the point of reference 20, and the capacitance coupling [by] *through* capacitor 9, *the potential at reference point 21 becomes negative and* diodes 10 and 17 *become* [are] back biased. *It will be evident that, for the potential at reference point 21 to fall to a negative value to back bias diodes 10 and 17, the resistance value of resistor 12 must be less than that of resistor 16.* Since the circuit 18–16–10–14–18 is *now* open circuited due to the diode 10 being non-conducting, transistor 2 will conduct due to the *potential at reference* point [of reference potential] 22 falling, as determined by the resistor 14. When transistor 2 conducts potential at the collector electrode 8 of transistor 2 rises to approximately ground level which, when applied through resistor 11 to the base electrode 3, holds transistor 1 non-conducting.

OPERATE CONDITION

At this point of the operation, capacitor 9 charges through the circuit 18–16–9–12–18, the [point of reference] potential *at reference points* 20–21 becoming more negative and positive respectively. *As* [When] the point[s] of reference 21 [reaches] *passes* ground potential, diodes 10 and 17 will become forward biased so the *potential at reference* point [of reference potential] 22 becomes approximately ground and reverse-biases the base-emitter junction of transistor 2. When transistor 2 becomes non-conducting, the *potential at reference* point [of reference potential] 19 becomes negative through the action of resistor 11 and the falling potential of collector 8 of transistor 2 so that transistor 1 conducts again. When transistor 1 becomes saturated, capacitor 9 discharges *both* through diode 10 and resistor 14 to the negative side of power supply 18, and through diode 17 to ground, [. Diode] *diode* 17 [carries] *carrying* the major portion of the capacitor discharge current and *being* [is] the prime determining factor for the multivibrator "recovery [time]" *or "reset" time. It is apparent that the maximum discharge current of the capacitor is limited only by the maximum permissible collector current of transistor 1 and the forward resistance of diode 17, so that very rapid recovery may be realized.* For example, an "operate" to "recovery time" ratio of 10:1 may be obtained through the use of this diode *17* as described.

It will be noted that during the operate time when transistors 1 and 2 are non-conducting and conducting respectively, and capacitor 9 charging that the only temperature dependent effects on the charging of the capacitor 9, [is] *are* due to the collector circuit of transistor 1 at the point of reference [potential] 20 and the leakage currents of diodes 10 and 17. Both of these currents are negligible over a wide temperature range because of the relatively large charging currents supplied through resistors 12 and 16.

Consider*ing* FIG. 2, the circuit described is the same as that described for FIG. 1 except that when transistor 1 becomes non-conducting the *potential at reference* point [of reference potential] 20 will fall towards the negative potential of supply 18, the [value of which will be] *potential to which reference point 20 falls being* determined by the product of the resistor 24 and the collector leakage current of transistor 1. The potential at 20' will be determined, as in FIG. 1, by the values of resistors 12 and 16 and the voltage across capacitor 9. It will be observed that by proper choice of resistors 12, 16 and 24 the potential at 20 will be more negative than the potential at 20' during the whole of the "operate" period causing diode 23 to be back-biased. Therefore, the complete resistor-capacitor circuit, 16, *12* [24] and 9, is disconnected from both transistor*s* 1, 2 while the monostable circuit is in its operate phase. Thus the charging of capacitor 9 will be effected only to a very small extent by the leakage currents of diodes 10, 17, 23.

What is claimed is:

1. A monostable transistor circuit comprising in combination:

(a) a first and second semiconductor device each having a base, emitter and collector electrode, (b) a capacitor and a first unidirectional means connected in series between the collector electrode of the first semiconductor device and the base electrode of the second semiconductor device, so that the cathode and anode of the unidirectional means are connected to the base electrode of the second semiconductor device and the capacitor respectively, (c) a first resistor connected between the collector electrode of the second semiconductor device and the base electrode of the first semiconductor device, (d) a source of potential, (e) a second resistor connected to a first terminal of the source, [poled to apply a predetermined potential thereto,] and to the base electrode of the first semiconductor device, (f) a third resistor connected to the first terminal of the source and to the anode of the unidirectional means, (g) a fourth and fifth resistor individually connected to the other terminal of the source and to the collector electrodes of the first and second semiconductor devices respectively, (h) a sixth resistor connected to the other terminal of the source and to the base electrode of the second semiconductor device, (i) means for grounding the emitter electrodes of the transistors.

2. A monostable transistor circuit defined in claim 1 having in combination therewith:

(a) a second unidirectional means *having its anode connected to the anode of* [connected back to back with] said first unidirectional means and *its cathode connected to* the emitter electrode of the said second transistor.

3. A monostable transistor circuit defined in claim 2 having in combination therewith:

(a) a third unidirectional means connected between the said capacitor and the collector electrode of the first semiconductor device so that the anode and cathode of the unidirectional means is connected to the collector electrode of the first semiconductor device and to the capacitor respectively, (b) a seventh resistor shunted across the third unidirectional means and the fourth resistor.

*4. A monostable flip-flop device having a stand-by condition, an operate period and a reset period, said device comprising*

*(a) a pair of transistors,*

*(b) coupling means interconnecting said transistors for mutual reversal of state including means biasing a first said transistor to conducting state and the second said transistor to non-conducting state during said standby condition,*

*(c) a timing circuit comprising a series connection of a first resistance, a capacitance, a second resistance and a source of voltage for charging said capacitance,*

*(d) said coupling means comprising a first coupling arm extending from the collector of the first transistor to the base of the second transistor, and a second coupling arm including a resistance element extending from the collector of the second transistor to the base of the first transistor,*

*(e) said first coupling arm including said capacitance for controlling the duration of said operate period in accordance with the characteristic of said timing circuit,*

*(f) triggering input means for rendering said first transistor non-conducting and hence, through the capacitance coupling of said first coupling arm, rendering said second transistor conducting to commence an operate period and to actuate said timing circuit to initiate charging of said capacitance,*

*(g) said first coupling arm including diode means connected between the base of said second transistor and the junction of said capacitance with one of said first and second resistances,*

*(h) and means to reverse bias said diode means during said operate period to isolate said second transistor from said capacitance.*

*5. A device according to claim 4,*

*(i) wherein said first coupling arm includes further diode means connected between the collector of said first transistor, and the junction of said capacitance with the other of said first and second resistances.*

*6. A monostable flip-flop device including first and second transistors and having a stand-by condition during which said first transistor is conducting and said second transistor is non-conducting, an operate period during which said second transistor is conducting and said first transistor is non-conducting, and a reset period; and a source of potential including a first potential, a second potential, and a reference potential between said first and second potentials, said device comprising:*

*(a) coupling means interconnecting said transistors for mutual reversal of state,*

*(b) said coupling means comprising a first coupling arm including a capacitance having one side coupled to the collector of the first transistor, and first diode means connected between the other side of said capacitance and the base of the second transistor, said first diode means being poled in a direction to prevent base current of said second transistor from passing therethrough,*

*(c) a first resistance connected between said first potential and said one side of said capacitance, and a second resistance connected between said other side of said capacitance and said second potential,*

*(d) said coupling means also comprising a second coupling arm including a third resistance connected between the base of the first transistor and the collector of the second transistor,*

*(e) a fourth resistance connected between the first potential and the collector of the second transistor, and a fifth resistance connected between the base of the first transistor and the second potential,*

*(f) a sixth resistance connected between the base of the second transistor and the first potential,*

*(g) second diode means connected to the emitter of said second transistor and extending to the junction of the capacitance with said first diode means, like polarity terminals of said two diode means being connected together,*

*(h) the emitters of both transistors being connected to said reference potential,*

*(i) said first resistance being less than said second resistance, said second resistance being less than said sixth resistance, and the sum of said third and fourth resistances being less than said fifth resistance;*

*whereby on application of a triggering pulse to the base of said first transistor to render said first transistor non-conducting, said second transistor becomes conducting to commence an operate period, both said diode means become reverse biased, and said capacitance is charged through said first and second resistances, said capacitance during said operate period being substantially isolated from said second transistor by said first diode means, and when said capacitance approaches a predetermined charge condition, said first diode means becomes forward biased to enable resetting of the device and said second diode means becomes forward biased for rapid discharging of said capacitance during said reset period.*

*7. A device according to claim 6 wherein said first coupling arm includes third diode means connected between the collector of said first transistor and said one side of said capacitance, said device further including a seventh resistance extending from the collector of said first transistor to said first potential, said first and third diode means being reverse biased during said operate period substantially to isolate said capacitance, during its charging, from both transistors.*

*8. A multivibrator circuit comprising*

*(a) a pair of like polarity transistors,*

*(b) coupling means interconnecting said transistors for mutual reversal of state,*

*(c) said coupling means including a first coupling arm comprising a capacitance having one side coupled to the collector of said first transistor, and first diode means connected between the other side of said capacitance and the base of said second transistor, said first diode means being poled in a direction to prevent flow of base current of said first transistor through said first diode means,*

*(d) said coupling means also including a second coupling arm connected between the collector of said second transistor and the base of said first transistor,*

*(e) a first timing resistance connected to said one side of said capacitance and a second timing resistance connected to said other side of said capacitance, said timing resistances forming with said capacitance a timing circuit for controlling the duration of a conducting period of said second transistor, charging current for said capacitance flowing through said timing circuit upon termination of conduction of said first transistor to shift the potential at said other side of said capacitance to reverse bias said first diode means,*

*(f) and means connected to the base of said second transistor and cooperating with said second timing resistance to forward bias said first diode means and reverse bias said second transistor when said first transistor is conducting, and to forward bias said second transistor when said first diode means is reverse biased.*

*whereby, when said first transistor ceases conduction, charging current flows through said timing circuit reverse biasing said first diode means to initiate conduction of said second transistor, said other side of said capacitance then charging to a predetermined potential to forward bias said first diode means thus to terminate conduction of said second transistor and initiate conduction of said first transistor, said capacitance being isolated during its charging by said reverse biased first diode means.*

*9. A multivibrator circuit according to claim 8, including second diode means connected between the emitter of said second transistor and the junction of said first diode means with said capacitance, like polarity of said first and second diode means being connected together, said second diode means being for rapid discharge of said capacitance upon termination of conduction of said second transistor and commencement of conduction of said first transistor.*

*10. A multivibrator circuit according to claim 9 wherein said first coupling arm includes third diode means connected between the collector of said first transistor and said one side of said capacitance, said third diode means being poled in the same direction in said first coupling arm as said first diode means, said multivibrator circuit further including means connected to the collector of said first transistor for reverse biasing said third diode means when said first transistor is non-conducting and said capacitance is charging, thus to isolate said capacitance during its charging from said first transistor.*

*11. A circuit according to claim 8 wherein said multivibrator is a monostable multivibrator, said second coupling arm comprising a resistance connected between the collector of said second transistor and the base of said first transistor, said multivibrator circuit including means biasing said first transistor to a normally conducting state, and triggering input means for rendering said first transistor non-conducting to initiate conduction of said second transistor.*

*12. A multivibrator circuit according to claim 11 including second diode means connected between the emitter of said second transistor and the junction of said first diode means with said capacitance, like polarity terminals of said first and second diode means being connected together, said second diode means being for rapid discharge of said capacitance upon termination of conduction*

*of said second transistor and commencement of conduction of said first transistor.*

*13. A circuit according to claim 12 including a source of potential which supplies first and second potentials and a reference potential between said first and second potentials, said timing circuit being connected across said source of potential with said first timing resistance connected to said first potential and said second timing resistance connected to said second potential, said means (f) comprising a resistance connected between the base of said second transistor and said first potential, and the emitters of said transistors being connected to said reference potential.*

*14. A circuit according to claim 13 wherein said first coupling arm includes third diode means connected between the collector of said first transistor and said one side of said capacitance, said third diode means being poled in the same direction in said first coupling arm as said first diode means, said multivibrator circuit further including means connected between the collector of said first transistor and said first potential for reverse biasing said third diode means when said first transistor is non-conducting and said capacitance is charging, thus to isolate said capacitance during its charging from said first transistor.*

*15. A multivibrator device comprising*

*(a) first and second like polarity transistors,*

*(b) first and second coupling arms interconnecting said transistors for mutual reversal of state,*

*(c) said first coupling arm including*

*(i) a capacitance,*

*(ii) means coupling one side of said capacitance to the collector of said first transistor and providing a very low impedance path for collector current of said first transistor between the collector of said first transistor and said capacitance,*

*(iii) means coupling the other side of said capacitance to the base of said second transistor,*

*(d) said second coupling arm being connected between the collector of said second transistor and the base of said first transistor,*

*(e) resistance means connected in series with said capacitance to form, with said capacitance, a timing circuit for controlling the duration of a conducting period of said second transistor,*

*(f) diode means connected directly to said other side of said capacitance connected to and the emitter of said second transistor, said diode means being poled to conduct collector current of said first transistor flowing through said capacitance,*

*(g) and low impedance means connecting together the emitters of said transistors,*

*so that, as said second transistor conducts, said capacitance charges through said timing circuit until said other side of said capacitance approaches the emitter potential of said second transistor to terminate conduction of said second transistor, said first transistor then commencing conduction and said capacitance discharging through a very low impedance path consisting of the emitter-collector path of said first transistor, said means (c)(ii), said capacitance, said diode means, and said low impedance means (g) for rapid recovery of said capacitance.*

References Cited by the Examiner

The following references, cited by the Examiner, are of record in the patented file of this patent or the original patent.

UNITED STATES PATENTS

| | | | |
|---|---|---|---|
| 2,850,630 | 9/1958 | Prugh | 307—88.5 X |
| 2,901,639 | 8/1959 | Woll | 307—88.5 |
| 2,952,784 | 9/1960 | Carr | 307—88.5 |
| 2,976,432 | 3/1961 | Geckle | 307—88.5 |
| 2,984,754 | 5/1961 | Wolfe. | |
| 3,033,998 | 5/1962 | Nellis | 307—88.5 |
| 3,068,406 | 12/1962 | Dellinger | 307—88.5 X |
| 3,109,105 | 10/1963 | Samuel | 307—88.5 |
| 3,143,667 | 8/1964 | Smithson | 307—88.5 |

ARTHUR GAUSS, *Primary Examiner.*

J. JORDAN, *Assistant Examiner.*